United States Patent Office 3,352,863
Patented Nov. 14, 1967

3,352,863
3,5-DISUBSTITUTED URACILS
Edward J. Soboczenski, Chadds Ford, Pa., assignor to E. I. du Pont de Nemours and Company, Wilmington, Del., a corporation of Delaware
No Drawing. Original application Sept. 6, 1962, Ser. No. 221,890, now Patent No. 3,235,358, dated Feb. 15, 1966. Divided and this application Dec. 27, 1965, Ser. No. 516,720
5 Claims. (Cl. 260—260)

ABSTRACT OF THE DISCLOSURE

The compounds are of the class of 3,5-disubstituted uracils and salts thereof, e.g. 3-cyclohexyl-5-bromo-uracil and 3-tert-butyl-5-chlorouracil, sodium salt, which are useful as herbicides.

---

This application is a division of copending application Ser. No. 221,890, filed Sept. 6, 1962, and now U.S. Patent No. 3,235,358, which in turn is a continuation-in-part of the following applications, now abandoned: application Ser. No. 89,673, filed Feb. 16, 1961, and application Ser. No. 12,956, filed Mar. 7, 1960.

This invention relates to novel 3,5-disubstituted uracils and various salts thereof. More specifically, the present invention is directed to uracils of the formula (1)
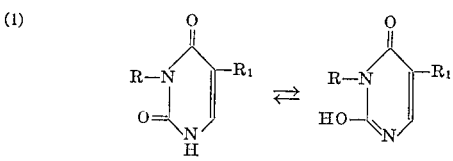

wherein: R is phenyl,
substituted phenyl,
cycloalkyl of 3 through 12 carbon atoms,
substituted cycloalkyl of 3 through 12 carbon atoms,
cycloalkenyl of 5 through 12 carbon atoms,
substituted cycloalkenyl of 5 through 12 carbon atoms,
or

wherein X is methyl or ethyl,
Y is hydrogen or methyl,
Z is alkyl of 1 through 6 carbon atoms;

and wherein said substituent for said phenyl, cycloalkyl, and cycloalkenyl groups is selected from the group consisting of alkyl of 1 through 4 carbon atoms or methoxy;
and
$R_1$ is halogen or methyl.

Also included within the invention are the salts of the uracils of Formula 1 formed with such cations as sodium, potassium, lithium, and quaternary ammonium.

The compounds of the present invention possess herbicidal activity making them useful wherever general weed control is required, such as on industrial sites, on railroad ballast and in non-crop agricultural areas. For example, a pre-emergence treatment with these compounds will control such germinating broadleaf weeds as pigweed, lamb's quarter, mustard, chickweed and ragweed, and such grass weeds as crab grass and foxtails.

These compounds can also be used in soil foliage applications for the control of such broadleaves as pigweed, lamb's quarter, mustard, chickweed and ragweed and such grass weeds as crab grass, foxtails, qauck grass and seedling Johnson grass.

Certain of the compounds exhibit selective herbicidal action in crops. For example, by properly selecting a compound of the invention and a rate and time of application, annual weeds growing in fields of peanuts can be controlled. This selective activity is described in greater detail in the examples which follow.

The concentration at which the compounds are to be used will vary according to the result desired, the type of vegetation, the formulation used, the mode of application, weather conditions, foliage density, and other similar factors. Since so many factors play a role, it is not possible to indicate a concentration suitable for all situations. Generally, when they are used in pre-emergence treatments, the compounds are used at concentrations of from 0.25 to 5 pounds of active ingredient per acre. Concentrations of from 0.5 to 4 pounds per acre are preferred. When used in soil-foliage applications, these compounds are used at concentrations of from 10 to 35 pounds of active ingredient per acre. The optimum concentration to be used in any particular application will be readily apparent to one skilled in the art.

The compounds of this invention are strong absorbers of ultraviolet radiation. They show, in addition to end absorption, a strong band near 270 m$\mu$. Consequently, these compounds are useful as ultraviolet screening agents. As a result of this property, these compounds can be employed in vinyl resin formulations to retard the deterioration by sunlight of the products fabricated therefrom.

The compounds of this invention, when applied to their environment, also control aquatic weeds, including algae.

The 3,5-disubstituted uracils hereof can be prepared according to the following equations:

(2)
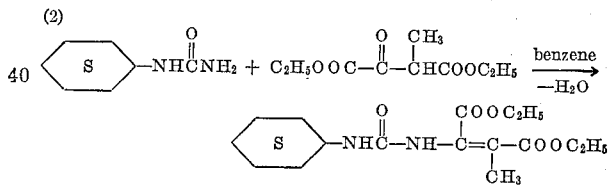

(3)
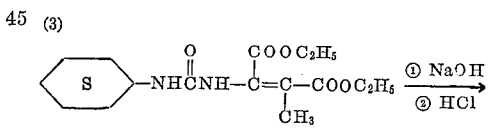

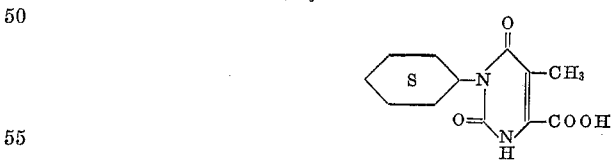

(4)
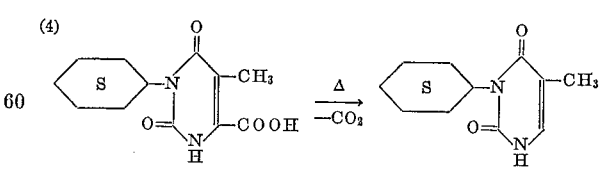

The cyclohexylurea of Equation 2 is condensed with the α-methyl oxalacetate in an inert solvent such as benzene, and in the presence of an acidic catalyst such as phosphoric acid. This reaction mixture is heated until approximately the theoretical amount of water has been removed. This will vary according to the starting materials used. The solvent is then removed and the residue is heated at reflux with a slight excess of aqueous sodium hydroxide, whereupon ring closure takes place. The resulting uracil carboxylic acid is decarboxylated to the desired uracil by heating it above its melting point, either by itself or in an inert, high-boiling-point liquid such as dibutyl phthalate or a eutectic mixture of diphenyl and diphenyl ether.

Other uracils can be prepared by substituting an appropriate substituted urea for the cyclohexylurea in Equation 2.

By substituting ethyl oxalacetate or ethyl α-fluorooxalacetate for the α-methyl oxalacetate in Equation 2, the corresponding 5-unsubstituted and 5-fluoro uracils can be prepared.

Uracils substituted in the 3-position in accordance with the scope of the present invention can be prepared according to the equations which follow. These 3-substituted uracils can then be readily converted to 3,5-disubstituted uracils of the present invention.

(5)

$$sec\text{-}C_4H_9NHC(O)\text{---}NH_2 + CH(OC_2H_5)_3 + CH_2(CN)_2 \longrightarrow$$

$$sec\text{-}C_4H_9\text{---}NHC(O)\text{---}NHCH=C(CN)_2$$

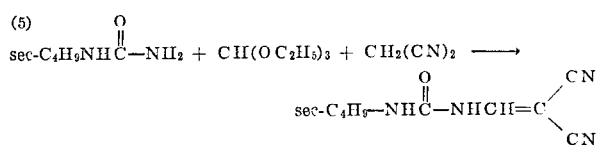

(6)

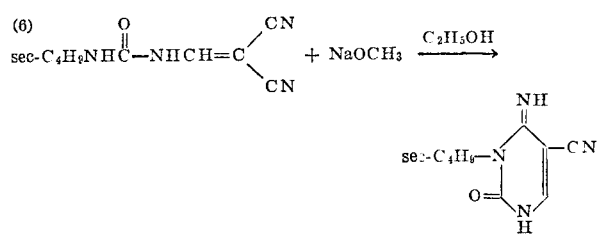

(7)

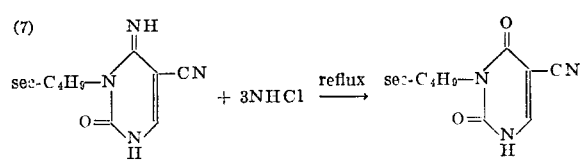

(8)

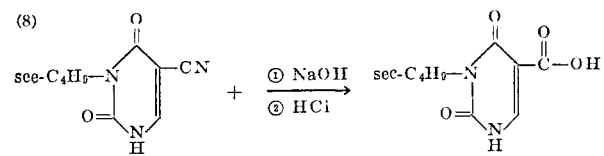

(9)

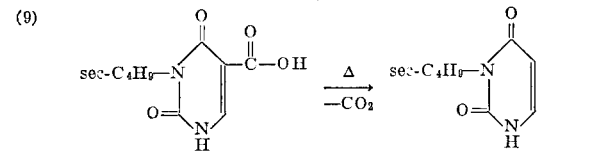

In Equation 5, a mixture of malononitrile, sec-butylurea and triethyl orthoformate, in molar ratios of 1:1:3, is heated at 70° C. to 100° C. with stirring for 1 to 3 hours. The excess ortho ester and ethanol are then removed at reduced pressure. The residue consists of essentially pure [(3-sec-butylureido)methylene]malononitrile.

This is dissolved in alcohol and converted to 3-sec-butyl-5-cyanocytosine by treatment with sodium methylate, as illustrated in Equation 6.

The 3-sec-butyl-5-cyanocytosine is converted to the corresponding uracil according to Equation 7 by a 3-hour reflux with 3 N hydrochloric acid. The uracil crystallizes from the aqueous solution on cooling.

On refluxing the 3-sec-butyl-5-cyanouracil with an excess of 25% sodium hydroxide solution, the nitrile is hydrolyzed according to Equation 8 with the formation of 3-sec-butyl-5-uracil carboxylic acid.

The acid is easily decarboxylated by heating it at a temperature above its melting point. This is illustrated by Equation 9. The resulting 3-sec-butyluracil is purified by recrystallization from solvents such as nitromethane or carbon tetrachloride.

3,5-disubstituted uracils can also be prepared from the 3-substituted uracils made according to Equations 5 to 9 by reacting them with electrophilic reactants according to the following equation:

(10)

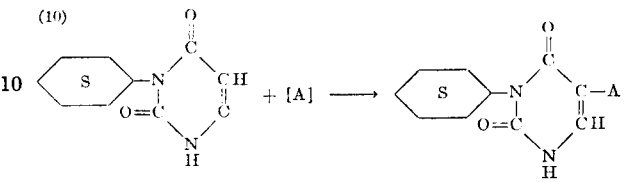

where A is bromine, chlorine, or iodine.

Other methods for preparing the uracils used according to this invention are set forth in J. Chem. Soc., 1956, 1877 and in J. Am. Chem. Soc., 74, 4267 (1952).

The salts of the compounds of Formula 1 are prepared by conventional methods such as dissolving the free uracil in an aqueous or nonaqueous solution of at least an equimolar amount of a base or basic salt containing the desired cation. For example, a sodium salt can be prepared by dissolving the uracil in water containing an equimolar amount of sodium hydroxide. The salt can then be isolated from the solution by removal of the water. The uracil salts which are not soluble in water can be prepared by treating an aqueous solution of an alkali metal salt of the uracil with an aqueous solution of a water-soluble salt of the metal.

The quaternary ammonium salts of the compounds of Formula 1 are prepared by reacting the substituted uracil with an appropriate quaternary ammonium hydroxide. Since these hydroxides are generally available in solution, the reaction is most conveniently carried out in the same solvent. If the salt is desired, it can be easily prepared by removing the solvent.

Alternatively, the quaternary ammonium salts of the uracils can be prepared in a dry inert solvent such as toluene, methanol or xylene by first preparing the corresponding sodium salt in the solvent. The appropriate quaternary ammonium halide is then added with stirring and, if necessary, mild heating. The sodium halide which forms is removed by filtration, leaving the quaternary ammonium salt of the uracil in solution. If desired, the dry salt can be prepared by removing the solvent, preferably in vacuo.

The compounds defined for the present invention can be prepared for herbicidal use by incorporating them with suitable adjuvants.

The amount of herbicide in such preparations can vary over a wide range according to need. Generally speaking, they will contain from about 0.5 to 95%, by weight of active ingredient.

Powder and dust preparations can be made by mixing compounds of the invention with finely-divided solids such as talcs, natural clays, pyrophyllite, diatomaceous earth; flours such as walnut shell, wheat, redwood, soya bean and cotton seed; or inorganic substances such as magnesium carbonate, calcium carbonate, calcium phosphate, sulfur and lime. These preparations are made by thoroughly blending the active ingredient and the solid. The particles in such preparations are preferably less than 50 microns in average diameter.

Water-soluble preparations can be prepared by mixing an active with an alkaline solubilizing agent. Solid bases having a pH of at least 9.5 in a 1% aqueous solution such as sodium or potassium phosphates, silicates, carbonates, borates, oxides or hydroxides are suitable. The preparations can contain from 0.5 to 80% of active ingredient and from 5 to 99.5% of the solubilizing agent.

Granules and pellets can be made by mixing a finely-divided active with a suitable clay such as kaolinite, montmorillonite or attapulgite, moistening this mixture with from 15 to 20% by weight of water, and then extruding the mass through a suitable die under pressure. The extrusions are cut into pre-determined lengths and then dried. These pellets can be granulated if desired.

Granules or pellets can also be prepared by spraying a suspension or solution of an active onto the surface of a preformed granule of clay, vermiculite or other suitable granular material. If the active is in solution, it will penetrate into the pores of the granule and so will adhere without the aid of a binding agent. When the active material is insoluble in the liquid and is carried as a suspension, it is preferable that a binding agent such as goulac, dextrin, swollen starch, glue or polyvinyl alcohol be added. In either case, the granule is then dried and ready for use.

Compositions of actives can also be prepared with non-aqueous liquids. Aliphatic and aromatic hydrocarbons, especially those derived from petroleum and having boiling points of from 125° C. to 400° C. are preferred. Hydrocarbons having lower boiling points should not be used because of their undesirable volatilization characteristics and inflammability. Liquid preparations in which the actives are not soluble are made by milling the components in a mill such as a pebble mill until the particles have average diameters of from 1 to 50 microns, preferably 5 to 20 microns.

The herbicidal preparations, whatever physical form they take, can also contain a surface-active agent. The surfactant renders the preparations readily dispersible in liquids and improves their action on waxy leaves and the like. For general application, surface-active agents are used in the preparations at concentrations of from about 1 to 10%, by weight. Levels of from 0.5 to 6 parts of surfactant for each part of active, however, give unusual and unexpected results. Preparations having these higher levels of surfactants show greater herbicidal effectiveness than can be expected from a consideration of activity of the components used separately.

The term "surface-active agent" is intended to include wetting agents, dispersing agents, suspending agents and emulsifying agents. Surface-active agents suitable for use are set forth in "Detergents and Emulsifiers, Annual 1965," John W. McCutcheon, Inc., Morristown, N.J. Other surface-active agents which can be used in these preparations are listed in U.S. Patents 2,139,276, 2,412,510, 2,426,417, and 2,655,447.

The preparations can also optionally contain adhesives such as gelatin, blood albumin and such resins as rosin alkyd resins. These increase retention and tenacity of deposits following application.

The alkali metal salts of the compounds of Formula 1 are especially advantageous for use as herbicides because they are soluble in water and can be applied as aqueous solutions.

The herbicidal compounds of the present invention can be combined with each other and with other known herbicides to give compositions which have advantages over the individual components.

Among the known herbicides which can be combined with the compounds of the invention are:

Substituted ureas 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
3-(p-chlorophenoxyphenyl)-1,1-dimethylurea These ureas can be mixed with the compounds of this invention in proportions of from 1:4 to 4:1, respectively, the preferred ratio being 1:2 to 2:1.

Substituted triazines 2-chloro-4,6-bis(ethylamino)-s-triazine
2-chloro-4,6-bis(isopropylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-ethylamino-4-(2-methoxyethylamino)-6-chloro-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine
2-methoxy-4-ethylamino-6-isopropylamino-s-triazine
2-isopropylamino-4-(2-methoxyethylamino)-6-methylmercapto-s-triazine These triazines can be mixed with the compounds of this invention in proportions of from 1:4 to 4:1, respectively, the preferred ratio being 1:2 to 2.1.

Phenols

Dinitro-o-sec-butylphenol and its salts
Pentachlorophenol and its salts

These phenols can be mixed with the compounds of this invention in the proportions of 1:10 to 10:1, respectively, the preferred ratio being 1:5 to 5:1.

Carboxylic acids and derivatives

The following carboxylic acids and derivatives can be mixed with the compounds of this invention in the listed respective proportions:

A 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
3-amino-2,5-dichlorobenzoic acid and its salts
3-nitro-2,5-dichlorobenzoic acid and its salts
2-methyl-3,6-dichlorobenzoic acid and its salts
2,3-dichloro-6-methylbenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
2-(2,4,5-trichlorophenoxy)ethyl-2,2-dichloropropionate
4-(2,4-dichlorophenoxy)butyric acid and its salts and esters
4-(2-methyl-4-chlorophenoxy)butyric acid and its salts and esters
2,3,6-trichlorobenzyloxypropanol Mixed in a 1:20 to 8:1 ratio, preferably a 1:8 to 4:1 ratio.

B. 2,6-dichlorobenzonitrile

Mixed in a 1:4 to 4:1 ratio, preferably a 1:3 to 3:1 ratio.

C. Trichloroacetic acid and its salts

Mixed in a 1:4 to 25:1 ratio, preferably a 1:2 to 10:1 ratio.

D. 2,2-dichloropropionic acid and its salts

Mixed in a 1:4 to 10:1 ratio, preferably a 1:2 to 5:1 ratio.

E

N,N-di(n-propyl)thiolcarbamic acid, ethyl ester
N,N-di(n-propyl)thiolcarbamic acid, n-propyl ester
N-ethyl-N-(n-butyl)thiolcarbamic acid, ethyl ester
N-ethyl-N-(n-butyl)thiolcarbamic acid, n-propyl ester Mixed in a 1:2 to 24:1 ratio, preferably a 1:1 to 12:1 ratio.

F

N-phenylcarbamic acid, isopropyl ester
N-(m-chlorophenyl)carbamic acid, isopropyl ester N-(m-chlorophenyl)carbamic acid, 4-chloro-2-butynyl ester
Mixed in a 1:2 to 24:1 ratio, preferably a 1:2 to 12:1 ratio.
G. 2,3,6-trichlorophenylacetic acid and its salts
Mixed in a 1:20 to 8:1 ratio, preferably a 1:4 to 4:1 ratio.

H 2-chloro-N,N-diallylacetamide
Maleic hydrazide
Mixed in a 1:2 to 10:1 ratio, preferably a 1:1 to 5:1 ratio.

*Inorganic and mixed inorganic-organic salts*

The following salts can be mixed with the compounds of this invention in the listed respective proportions:

A

Calcium propylarsonate
Disodium monomethylarsonate
Octyl-dodecylammoniummethylarsonate
Dimethyl arsinic acid
Mixed in a 1:4 to 8:1 ratio, preferably a 1:2 to 4:1 ratio.
B. Sodium arsenite
Mixed in a 1:10 to 40:1 ratio, preferably a 1:5 to 25:1 ratio.

C

Lead arsenate
Calcium arsenate
Mixed in a 150:1 to 600:1 ratio, preferably a 100:1 to 400:1 ratio.

D

Sodium tetraborate hydrated, granulated
Sodium metaborate
Sodium pentaborate
Unrefined borate ore such as borascu
Polychlorborate
Mixed in a 6:1 to 1500:1 ratio, preferably a 3:1 to 1000:1 ratio.
E. Sodium chlorate
Mixed in a 2:1 to 40:1 ratio, preferably a 1:1 to 20:1 ratio.
F. Ammonium sulfamate
Mixed in a 1:1 to 100:1 ratio, preferably a 1:1 to 50:1 ratio.
G. Ammonium thiocyanate
Mixed in a 1:10 to 20:1 ratio, preferably a 1:5 to 5:1 ratio.

*Other organic herbicides*

The following herbicides can be mixed with the compounds of this invention in the listed respective proportions.

A 1,1'-ethylene-2,2'-dipyridylium cation
1,1'-ethylene-4,4'-dipyridylium cation
Mixed in a 1:20 to 16:1 ratio, preferably a 1:5 to 5:1 ratio.
B. 3-amino-1,2,4-triazole
Mixed in a 1:20 to 20:1 ratio, preferably a 1:5 to 5:1 ratio.
C. 3,6-endoxohexahydrophthalic acid
Mixed in a 1:4 to 20:1 ratio, preferably a 1:2 to 10:1 ratio.

D

Diphenylacetonitrile
N,N-dimethyl-α,α-diphenylacetamide
N,N-di(n-propyl)-2,6-dinitro-4-trifluoromethylaniline
N,N-di(n-propyl)-2,6-dinitro-4-methylaniline
Mixed in a 1:10 to 30:1 ratio, preferably a 1:5 to 20:1 ratio.

E

O-(2,4-dichlorophenyl) - O - methyl-isopropylphosphoramidothionate
2,3,5,6-tetrachloroterephthalic acid, dimethyl ester
Mixed in a 1:4 to 20:1 ratio, preferably a 1:3 to 15:1 ratio.

F 2,4-dichloro-4'-nitrodiphenyl ether
2,3,5-trichloro-4-pyridinol
4-amino-3,5,6-trichloropicolinic acid
Mixed in a 1:10 to 30:1 ratio, preferably a 1:5 to 20:1 ratio.

*Other substituted uracils*

The compounds of this invention can be mixed with other known herbicidal uracils, in the respective proportions listed below:

A 3-isopropyl-5-bromo-6-methyluracil
3-isopropyl-5-chloro-6-methyluracil
3-sec-butyl-5-bromo-6-methyluracil
3-sec-butyl-5-chloro-6-methyluracil
3-cyclohexyl-5-bromo-6-methyluracil
3-cyclohexyl-5-chloro-6-methyluracil
3-tert-butyl-5-bromo-6-methyluracil
3-tert-butyl-5-chloro-6-methyluracil
Mixed in a 1:4 to 4:1 ratio, preferably a 1:2 to 2:1 ratio.

B 3-cyclohexyl-6-methyluracil
3-cyclohexyl-6-ethyluracil
3-cyclohexyl-6-sec-butyluracil
3-norbornyl-6-methyluracil
3-cyclopentyl-6-methyluracil
3-cyclohexyl-6-isopropyluracil
Mixed in a 1:4 to 4:1 ratio, preferably a 1:2 to 2:1 ratio.

C 3-isopropyl-1-trichloromethylthio-5-bromo-6-methyluracil
3-cyclohexyl-1-trichloromethylthio-5-bromo-6-methyluracil
3-sec-butyl-1-acetyl-5-bromo-6-methyluracil
3-isopropyl-1-acetyl-5-bromo-6-methyluracil
3-isopropyl-1-trichloromethylthio-5-chloro-6-methyluracil
3-isopropyl-1-methyl-5-bromo-6-methyluracil
3-cyclohexyl-1-methyl-5-chloro-6-methyluracil
3-cyclohexyl-1,6-dimethyluracil
Mixed in a 1:4 to 4:1 ratio, preferably a 1:2 to 2:1 ratio.

D 3-cyclohexyl-5,6-trimtehyleneuracil
3-sec-butyl-5,6-trimethyleneuracil
3-isopropyl-5,6-trimethyleneuracil
3-cyclohexyl-5,6-tetramethyleneuracil
3-isopropyl-5,6-tetramethyleneuracil
Mixed in a 1:4 to 4:1 ratio, preferably a 1:2 to 2:1 ratio.

Many of the above materials; e.g. borates, arsonates, dinitro sec-butylphenol, etc. act as bactericides and fungicides. Addition of these compounds, or compounds of similar action, inhibit the degradation and inactivation of the herbicidal compounds of the invention by soil microorganisms.

EXAMPLES

This invention will be better understood by referring to the following illustrative examples relating to the preparation of compounds and the preparation and use of herbicidal compositions containing them.

EXAMPLE 1

A mixture of 56.8 parts of cyclohexylurea, 73 parts of diethyl 2-methyl oxalacetate, and 4 parts of 85% orthophosphoric acid in 400 parts of benzene is heated at reflux for 8 hours, during which time 7.8 parts of water are collected. The solvent is removed and the residual oil taken up in 400 parts of water containing 24 parts of sodium hydroxide. The solution is heated on a steam bath with agitation for 2 hours. Acidification with concentrated hydrochloric acid causes precipitation of 3-cyclohexyl-5- methyluracil-6-carboxylic acid. This is collected by filtration, air-dried, and taken up as a suspension in 100 parts of a eutectic mixture of diphenyl ether and diphenyl. This mixture is stirred and heated at reflux, whereupon $CO_2$ is evolved. Upon completion of the $CO_2$ evolution, the mixture is cooled, filtered, and the solvent washed out with benzene. Crystalline 3-cyclohexyl-5-methyluracil remains.

The following compounds are prepared as in Example 1 by substituting equivalent amounts of mono substituted ureas and equivalent amounts of oxalacetates set forth in the following table for the cyclohexylurea and diethyl-α-methyloxalacetate:

| Oxalacetate | Parts by Weight | Urea | Parts by Weight | Substituted Uracil Product |
|---|---|---|---|---|
| Diethyl 2-methyloxalacetate | 73 | sec-Butylurea | 46.3 | 3-sec-3-butyl-5-methyluracil. |
| Do | 73 | 1-(4-methoxycyclohexyl)urea | 63.8 | 3-(4-methoxycyclohexyl)-5-methyluracil. |
| Do | 79 | tert-Butylurea | 46.3 | 3-tert-butyl-5-methyluracil. |
| Do | 73 | Norbornenylurea | 62.3 | 3-norbornenyl-5-methyluracil. |
| Do | 73 | 2-methylcyclohexyl urea | 57 | 3-(2-methylcyclohexyl)-5-methyluracil. |
| Do | 73 | 1-(decahydro-1,4-5,8-dimethanonaphth-2-yl)urea | 88.4 | 3-(decahydro-1,4-5,8-dimethanonaphth-2-yl)-5-methyluracil. |
| Do | 73 | Bornylurea | 61.2 | 3-bornyl-5-methyluracil. |
| Diethyl 2-fluorooxalacetate | 74.1 | Cyclohexylurea | 57 | 3-cyclohexyl-5-fluorouracil. |
| Do | 74.1 | β-Decahydronaphthylurea | 78.4 | 3-(β-decahydronaphthyl)-5-fluorouracil. |
| Do | 74.1 | Cycloheptylurea | 62.5 | 3-cycloheptyl-5-fluorouracil. |
| Do | 74.1 | sec-Butylurea | 47 | 3-sec-butyl-5-fluorouracil. |
| Do | 74.1 | Bicyclo[2,2,2] oct-2-ylurea | 67.2 | 3-bicyclo[2,2,2]oct-2-yl-5-fluorouracil. |
| Do | 74.1 | Isopropylurea | 41 | 3-isopropyl-5-fluorouracil. |
| Do | 74.1 | Phenylurea | 54.4 | 3-phenyl-5-fluorouracil. |
| Do | 74.1 | Norbornylurea | 62 | 3-norbornyl-5-fluorouracil. |
| Diethyl 2-methyloxalacetate | 73 | 2-methylcyclohexylurea | 57 | 3-(2-methylcyclohexyl)-5-methyluracil. |
| Do | 73 | 1-(4-methylcyclohexyl)urea | 57 | 3-(4-methylcyclohexyl)-5-methyluracil. |
| Do | 73 | 1-(1,1-dimethylpentyl)urea | 63.6 | 3-(1,1-dimethylpentyl)-5-methyluracil. |
| Do | 73 | 1-(1-ethylbutyl)urea | 58 | 3-(1-ethylbutyl)-5-methyluracil. |
| Do | 73 | Cyclooctylurea | 68 | 3-cyclooctyl-5-methyluracil. |
| Do | 73 | Norbornylurea | 62.5 | 3-norbornyl-5-methyluracil. |
| Do | 78.5 | Cyclopentylurea | 51 | 3-cyclopentyl-5-methyluracil. |
| Do | 73 | Cyclohexenylurea | 56 | 3-cyclohexenyl-5-methyluracil. |
| Do | 73 | Cyclopentenylurea | 50 | 3-cyclopentenyl-5-methyluracil. |
| Do | 73 | Cyclopropylurea | 41 | 3-cyclopropyl-5-methyluracil. |
| Do | 73 | Isopropylurea | 41 | 3-isopropyl-5-methyluracil. |
| Do | 73 | sec-Butylurea | 47 | 3-sec-butyl-5-methyluracil. |
| Do | 73 | Fenchylurea | 29.6 | 3-fenchyl-5-methyluracil. |
| Do | 73 | 2-dodecylurea | 108 | 3-(2-dodecyl)-5-methyluracil. |

EXAMPLE 2

Seventeen parts by weight of bromine are added over a 20-minute period to a stirred solution of 19.4 parts by weight of 3-cyclohexyluracil in 100 parts by weight of glacial acetic acid. The temperature is maintained below 30° C. during the addition. The solution is stirred at 20–30° C. for an additional 1½ hours and is then poured into 2 volumes of ice water with stirring, whereupon a white solid separates. This solid is filtered, washed with water until acid-free, and dried to give essentially pure 3-cyclohexyl-5-bromouracil.

The following compounds are prepared as in Example 2 by substituting equivalent amounts of the 3-substituted uracils and halogens set forth in the following table for the 3-cyclohexyluracil and bromine:

EXAMPLE 3

A mixture of 194 parts of 3-cyclohexyluracil, 1000 parts of acetic acid, and 253 parts of iodine is stirred at 100° C. as 72 parts of fuming nitric acid are gradually added. When the addition is complete, the dark colored solution is refluxed for about one-half hour and then cooled to ice-bath temperature.

The excess iodine which precipitates is filtered off and the filtrate is diluted with 4000 parts by weight of cold water. The iodine remaining in solution is reduced to iodide ion by adding a saturated solution of sodium bisulfite until the solution becomes colorless.

The aqueous solution is extracted with 6000 parts by weight of methylene chloride, the organic layer is separated, washed with saturated sodium bicarbonate solution and distilled under reduced pressure to give solvent-free, essentially pure 3-cyclohexyl-5-iodouracil.

The uracils in the following table can be similarly prepared by substituting equivalent amounts of properly 3-substituted uracils for 3-cyclohexyluracil:

3-bornyl-5-iodouracil
3-cyclopropyl-5-iodouracil
3-cyclobutyl-5-iodouracil
3-cyclopentyl-5-iodouracil
3-sec-butyl-5-iodouracil
3-isopropyl-5-iodouracil
3-norbornyl-5-iodouracil
3-decahydronaphthyl-5-iodouracil

| Uracil Starting Reactant | Parts by Weight | Halogen | Parts by Weight | Uracil Product |
|---|---|---|---|---|
| 3-cyclohexyluracil | 19.4 | Br | 17.0 | 3-cyclohexyl-5-bromouracil. |
| 3-cyclopentyluracil | 18.0 | Br | 17.0 | 3-cyclopentyl-5-bromouracil. |
| 3-cyclooctyluracil | 22.2 | Cl | 8.0 | 3-cyclooctyl-5-chlorouracil. |
| 3-cyclopentenyluracil | 17.8 | Cl | 8.0 | 3-cyclopentenyl-5-chlorouracil. |
| 3-isopropyluracil | 15.4 | Br | 17.0 | 3-isopropyl-5-bromouracil. |
| 3-phenyluracil | 18.8 | Br | 17.0 | 3-phenyl-5-bromouracil. |
| 3-tert-butyluracil | 15.3 | Br | 17.0 | 3-tert-butyl-5-bromouracil. |
| 3-sec-amyluracil | 18.2 | Br | 17.0 | 3-sec-amyl-5-bromouracil. |
| 3-(bicyclo[2,2,2]oct-5-en-2-yl) | 21.8 | Br | 17.0 | 3-(bicyclo[2,2,2]oct-5-en-2-yl)-5-bromouracil. |
| 3-(1,2-dimethylcyclopentyl)uracil | 20.8 | Br | 17.0 | 3-(1,2-dimethylcyclopentyl)-5-bromouracil. |
| 3-fenchyluracil | 24.8 | Cl | 8.0 | 3-fenchyl-5-chlorouracil. |
| 3-norbornenyluracil | 20.4 | Br | 17.0 | 3-norbornenyl-5-bromouracil. |
| 3-(3,4-dimethylcyclohexyl)uracil | 21.6 | Cl | 8.0 | 3-(3,4-dimethylcyclohexyl)-5-chlorouracil. |
| 3-(3a,4,5,6,7,7a-hexahydro-4,7-methano-5-indanyl)uracil | 44.5 | Br | 17.0 | 3-(3a,4,5,6,7,7a-hexahydro-4,7-methano-5-indanyl)-5-bromouracil. |
| 3-(γ-1,2,3,4-tetrahydronaphthyl)uracil | 24.2 | Cl | 8.0 | 3-(γ-1,2,3,4-tetrahydronaphthyl)-5-chlorouracil. |
| 3-(1,2,3,4,4a,5,6,7,8,8a-decahydronaphth-6-yl)uracil | 26.1 | Br | 17.0 | 3-(1,2,3,4,4a,5,6,7,8,8a-decahydronaphthyl)-5-bromouracil. |
| 3-(5,6,7,8-tetrahydronaphthyl)uracil | 23.1 | Br | 17.0 | 3-(5,6,7,8-tetrahydronaphthyl)-5-bromouracil. |
| 3-(2-dodecyl)uracil | 28.0 | Br | 17.0 | 3-(2-dodecyl)-5-bromouracil. |

EXAMPLE 4

A solution of 4 parts by weight of sodium hydroxide in 100 parts of water is treated with 20.3 parts by weight of 3-sec-butyl-5-chlorouracil. Stirring and warming is employed to effect solution. Water is removed under reduced pressure, leaving 3-sec-butyl-5-chlorouracil, sodium salt as a white residue.

EXAMPLE 5

One hundred eighty-two parts of 3-tert-butyl-5-methyluracil are gradually added, with stirring, to 835 parts of a one-molar solution if tetrabutylammonium hydroxide in methanol. When solution is complete, the solvent, is distilled off at reduced pressure. The white solid tetrabutylammonium salt of 3-tert-butyl-5-methyluracil which remains is sufficiently pure for incorporation into herbicidal formulations.

EXAMPLE 6

The following components are prepared as a concentrated aqueous solution:

| | Percent |
|---|---|
| 3-tert-butyl-5-chlorouracil, Na salt | 20 |
| Sodium lauryl sulfate | 2 |
| Water | 78 |

Other soluble salts suitable for preparation of water concentrates are 3-(decahydro-1,4-5,8-dimethanonaphthyl)-5-methyluracil, Na salt
5-bromo-3-cyclohexyluracil, Na salt
3-fenchyluracil, Na salt
3-(1-ethylhexyl)-5-methyluracil, K salt
3-(1,1-dimethylbutyl)-5-methylauracil, K salt The aqueous solution of 3-(tert-butyl)-5-chlorouracil, sodium salt, is used for directed postemergence weed control in gladiolus beds. A concentration of one pound of active ingredient per acre in 30 gallons of water gives excellent control of seedling weeds such as crab grass, pigweed, velvet weed, and flower-of-an-hour. Care must be taken to direct the spray so as to avoid contact with gladioli plants.

At concentrations of 15 to 25 pounds per acre in 80 gallons of water, all of the above compositions give excellent control of a wide variety of annular grasses and broadleaf weeds growing on railroad ballast.

EXAMPLE 7

A water suspension is prepared by grinding the following ingredients together in a ball or roller mill until the solids are finely dispersed in the water and the average particle size is less than 5 microns:

| | Percent |
|---|---|
| 3-fenchyl-5-methyluracil | 25 |
| Hydrated attapulgite | 2 |
| Sodium lignin sulfonate | 5 |
| Water | 68 |

EXAMPLE 8

A water suspension is prepared by grinding the following ingredients together in a ball or roller mill:

| | Percent |
|---|---|
| 3-isopropyl-5-bromouracil | 25 |
| Hydrated attapulgite | 2 |
| Lignin sulfonic acid, Na salt | 5 |
| Water | 68 |

Grinding is continued until the particles in the suspension have been reduced to diameters of less than 5 microns.

The water suspensions of Examples 7 and 8 control seedling broadleaf weeds growing along fence rows. An application of the suspensions with a pressure sprayer at concentrations of 10 to 20 pounds of active ingredient per acre in 120 gallons of water controls mustard and chickweed seedlings.

EXAMPLE 9

The following ingredients are used to prepare an oil suspension:

| | Percent |
|---|---|
| 3-(sec-butyl)-5-methyluracil | 15 |
| Diesel oil | 80 |
| Polyoxyethylene sorbitan esters of mixed rosin and fatty acids | 5 |

The ingredients are ground together in a ball or roller mill until the solids are finely dispersed in the oil and the average particle size of the active ingredient is less than 5 microns. This oil suspension is diluted with water to firm a water emulsion for application to plants.

3-(4-isopropylcyclohexyl)-5-bromouracil, 3-(4-methylcyclohexyl)-5-methyluracil, 3-cyclohexyl-5-bromouracil and 3-cyclopentenyl-5-bromouracil are prepared as oil suspensions in a similar manner.

The emulsifiable oil of Example 9 is useful for weed control in railroad yards and cattle yards. When this composition is diluted with water at a rate of 160 gallons per acre and sprayed from a railroad spray car at a level of about 25 pounds of active material per acre, vegetation such as quack grass, crab grass, seedling Johnson grass, seedling Bermuda grass, brome grass, ragweed, lamb's quarter, and marestail is controlled for an extended period.

This same oil suspension composition, when applied to a drainage ditch infested with mixed annual and perennial broadleaf and grass weeds at concentrations of 25 pounds of active material per acre in 150 gallons of water, also gives excellent control of vegetation. The ditch remains bare for an extended period.

EXAMPLE 10

The following ingredients are used to prepare an oil solution:

| | Percent |
|---|---|
| 3-isopropyl-5-bromouracil | 10.0 |
| 2,3,6-trichlorobenzoic acid | 10.0 |
| Xylene | 80.0 |

The solid ingredients are added to the xylene and stirred at ambient temperature until they dissolve.

This solution controls deep-rooted perennial herbaceous weeds and woody vines. A solution of fifty pounds of active ingredients is diluted to 100 gallons with a herbicidal oil and sprayed on a dense tangled growth of vines and weeds along a railroad right-of-way. Good control of trumpet vine, bindweed, poison ivy, barnyard grass, foxtail, ragweed, and marestail is obtained.

EXAMPLE 11

The following ingredients are used to prepare an oil dispersion:

| | Percent |
|---|---|
| 3-cyclohexyl-5-methyluracil | 25.00 |
| 2,4,5-trichlorophenoxyacetic acid, isooctyl ester | 6.25 |
| Paraffin oil (90% unsulfonatable residue) | 68.75 |

The uracil and oil are mixed together and wet-milled until the particles are under 10 microns in diameter. The ester is then added to this suspension.

This formulation is extended with No. 2 fuel oil and spread at 20 pounds of active ingredients in 50 gallons of oil per acre around electric power poles and transformer stations. Good control or brambles, honeysuckle, poison ivy, pokeweed, corn cockle, panic grass, ragweed, and sowthistle is obtained.

EXAMPLE 12

An emulsifiable concentrate is prepared by mixing the following three components:

| | Percent |
|---|---|
| 3-tert-butyl-5-methyluracil | 20 |
| Alkylaryl polyether alcohol | 5 |
| Dibutyl ketone | 75 |

This concentrate can be extended with water to give an emulsion.

This formulation is extended with 30 gallons of water and used in post-emergence applications at levels of 2 to 4 pounds of active ingredient per acre on young germinating annual weeds in established asparagus beds. It is applied in the spring, prior to the emergence of the asparagus spears. Good control of foxtail, lamb's quarter, pigweed and cocklebur is obtained.

EXAMPLE 13

A noncaking, soluble powder is prepared by blending and micropulverizing the following ingredients:

| | Percent |
|---|---|
| 3-sec-butyl-5-chlorouracil, sodium salt | 90 |
| Diatomaceous silica | 10 |

When the powder is placed in water in a spray tank, the active material dissolves, leaving the silica in suspension.

This soluble salt composition is used for control of mixed annual and perennial vegetation growing around oil tank installations. Concentrations of 20 to 30 pounds of active ingredient per acre in 80 gallons of water give excellent weed control for an extended period.

Other soluble uracil salts which can be prepared and used in the same manner with good results are 3-cyclohexyl-5-bromouracil, potassium salt
5-bromo-3-phenyluracil, sodium salt.

EXAMPLE 14

The following ingredients are used to prepare a water-soluble powder by blending until homogeneous, micropulverizing until the particles are 50 microns or less in diameter, and then reblending:

| | Percent |
|---|---|
| 3-tert-butyl-5-methyluracil | 50.0 |
| Trisodium phosphate (anhydrous) | 42.5 |
| Sodium lignin sulfonate | 5.0 |
| Sodium lauryl sulfate | 2.5 |

Equivalent amounts of other basic salts such as sodium metaborate or hydrates of trisodium phosphate may be used in this formulation in place of the anhydrous trisodium phosphate.

When applied at the rate of 4 to 6 pounds (active) per acre in 40 gallons of water, this formulation controls seedlings of such annual and perennial grasses as Johnson grass, giant foxtail, barnyard grass, crab grass, cheat, wild barley and annual broadleaves such as pigweed and lamb's quarter growing along a roadside.

EXAMPLE 15

The following composition is blended and micropulverized, then mixed with 15%–20% water and extruded under pressure through an orifice to produce rods which are cut into pellets and dried:

| | Percent |
|---|---|
| 3-sec-butyl-5-bromouracil | 25 |
| Alkylnaphthalene sulfonic acid, Na salt | 1 |
| Anhydrous sodium sulfate | 10 |
| Non-swelling bentonitric clay | 64 |

EXAMPLE 16

The following composition is used to prepare granules by dissolving the active ingredient in water and spraying it on tumbling vermiculite and then drying the product:

| | Percent |
|---|---|
| 3-phenyl-5-chlorouracil, sodium salt | 25 |
| 8–20 mesh expanded vermiculite | 75 |

Other compounds suitable for the preparation of this type of granule are 3-cyclooctyl-5-iodouracil, sodium salt
3-(β-decahydronaphthyl)-5-chlorouracil, sodium salt
3-(bornyl)-5-fluorouracil, sodium salt
3-(3,4-xylyl)-5-methyluracil, potassium salt Any of the granular compositions of this example can be applied by hand or by specially built spreaders at concentrations of 25 to 30 pounds of active ingredient per acre, for the control of broadleaf and grass weeds in lumber yards, along railroad rights-of-way, in fire lanes and around billboards, and in parking areas and roadsides.

EXAMPLE 17

A wettable powder is prepared by blending and micropulverizing the following ingredients:

| | Percent |
|---|---|
| 3-cyclohexyl-5-iodouracil | 80.00 |
| Dioctyl sodium sulfosuccinate, 85–15 condensate with sodium benzoate | 1.00 |
| Low viscosity methyl cellulose | 0.25 |
| Attapulgite clay | 18.75 |

Twenty-five pounds of this wettable powder and 23.5 pounds of an 85% formulation of 2,2-dichloropropionic acid, sodium salt, are mixed thoroughly in 150 gallons of water. This spray mixture, applied at 150 gallons per acre along a highway shoulder, gives good control of a heavy population of Johnson grass, lamb's quarter, ragweed, barnyard grass, smartweed, pigweed, and goatweed. The shoulder remains free of these troublesome weed species for an extended period.

I claim:

1. A compound selected from the group consisting of
   (a) compounds of the formula

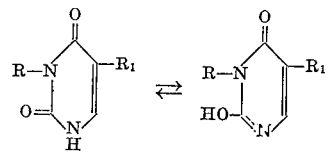

where R is phenyl, substituted phenyl wherein said substituent is selected from the group consisting of alkyl of 1 through 4 carbon atoms and methoxy,
cycloalkyl of 3 through 12 carbon atoms, substituted cycloalkyl of 3 through 12 carbon atoms wherein said substituent is selected from the group consisting of alkyl of 1 through 4 carbon atoms and methoxy,
cycloalkenyl of 5 through 12 carbon atoms, substituted cycloalkenyl of 5 through 12 carbon atoms wherein said substituent is selected from the group consisting of alkyl of 1 through 4 carbon atoms and methoxy, or

wherein
X is methyl or ethyl
Y is hydrogen or methyl
Z is alkyl of 1 through 6 carbon atoms;
$R_1$ is halogen; and (b) the sodium, potassium, lithium, and lower alkyl quaternary ammonium salts of the compounds of (a).
2. 3-cyclohexyl-5-bromouracil.
3. 3-sec-butyl-5-bromouracil.
4. 3-tert-butyl-5-bromouracil.
5. 3-tert-butyl-5-chlorouracil, sodium salt.

References Cited

Lacey et al., Jour. Chem. Soc. 1958, pp. 2134–2141.
Senda et al., Chem. Abstracts, vol. 53, 1959, pp. 10237–8. (Abstract of Chem. Pharm. Bull., vol. 6, pp. 479–482, 1958).

NICHOLAS S. RIZZO, *Primary Examiner.*

M. O'BRIEN, FRANK A. MIKA, *Assistant Examiners.*